United States Patent [19]

Kühnel

[11] 4,158,603
[45] Jun. 19, 1979

[54] BLOW-OFF DEVICE FOR LIMITING EXCESS PRESSURE IN NUCLEAR POWER PLANTS, ESPECIALLY IN BOILING-WATER NUCLEAR POWER PLANTS

[75] Inventor: Roland Kühnel, Dietzenbach, Fed. Rep. of Germany

[73] Assignee: Kraftwerk Union Aktiengesellschaft, Mülheim, Fed. Rep. of Germany

[21] Appl. No.: 774,945

[22] Filed: Mar. 7, 1977

[30] Foreign Application Priority Data

Mar. 8, 1976 [DE] Fed. Rep. of Germany ....... 2609571

[51] Int. Cl.$^2$ .............................................. G21C 9/00
[52] U.S. Cl. ........................................ 176/38; 176/87; 261/77; 261/123
[58] Field of Search ................. 176/37, 38, 65, 87; 261/77, 121 R, 122, 123, 124

[56] References Cited

U.S. PATENT DOCUMENTS

| 3,989,477 | 11/1976 | Wilson et al. ................. 261/122 X |
| 4,022,655 | 5/1977 | Gaouditz et al. ...................... 176/38 |

Primary Examiner—Samuel W. Engle
Assistant Examiner—Ralph Palo
Attorney, Agent, or Firm—Herbert L. Lerner

[57] ABSTRACT

In a blow-off device for limiting excess pressure in nuclear power plants, at least one condensation tube disposed so that a lower outlet end thereof is immersed in a volume of water in a condensation chamber having a gas cushion located in a space above the volume of water, and the upper inlet end of the condensation tube extending out of the volume of water and being connectible to a source of steam that is to be condensed or a steam-air mixture, the outlet end of the condensation tube, for smoothing the condensation, being provided with wall parts forming passages extending in axial direction, delimited from one another and terminating in the water volume, the wall parts serving to subdivide steam flow from the source thereof and bubbles produced thereby in the water volume, the wall parts being constructed as a tube attachment and being formed with an opening corresponding to the outlet end of the condensation tube and by means of which the tube attachment is mounted on the outlet end of the condensation tube, a first group of the wall parts in the tube attachment being disposed in alignment with the outlet end of the condensation tube, and a second group of the wall parts surrounding the first group thereof, the passages formed by the second group of the wall parts communicating laterally with the passages formed by the first group of the wall parts, the passages formed by the second group of the wall parts, at least at the upper ends thereof, communicating with the water volume.

6 Claims, 8 Drawing Figures

BLOW-OFF DEVICE FOR LIMITING EXCESS PRESSURE IN NUCLEAR POWER PLANTS, ESPECIALLY IN BOILING-WATER NUCLEAR POWER PLANTS

The invention relates to a blow-off device for limiting excess pressure in nuclear power plants, especially in boiling water nuclear power plants, and more particularly wherein the blow-off device has at least one condensation tube disposed so that a lower outlet end thereof is immersed in a volume of water (condensate) in a condensation chamber having a gas cushion located in a space above the volume of water, and the upper inlet end of the condensation tube extending out of the volume of water and being connected to a source of steam that is to be condensed or a steam-air mixture, the outlet end of the condensation tube, for smoothing the condensation, being provided with wall parts forming passages extending in axial direction, delimited from one another and terminating in the water volume, the wall parts serving to subdivide steam flow from the source thereof and bubbles produced in the water volume.

Such a blow-off device has become known heretofore from German Published Prosecuted Application DT-AS 2 212 761; especially in FIG. 5 thereof. In this heretofore known device, the passages terminating in the water condensate are formed by annular channels of telescoping tube sections. It has also become known heretofore from German Published Non-Prosecuted Application DT-OS 2 457 901 to subdivide more finely the outlet cross section of the condensation tube. The interior of the outlet of the condensation tube is provided with a framework of wall parts.

Even if a relatively fine subdivision of the steam flow and the bubbles can be effected by means of the last-mentioned heretofore known device, the cooling and wetting of the partial flows of steam, especially for high-quantity flows of steam, are relatively slight, because all of the passages are then filled with saturated steam, the partial flows of steam being able to be reunited as bubbles as they exit from the tube outlet end. It is accordingly an object of the invention to provide a blow-off device for limiting excess pressure in nuclear power plants that is of such improved and perfected construction and operation that good cooling and wetting of the partial steam flows and partial bubbles are produced during the blow-off process, and wherein the production and attachment of the wall parts to the condensation tube is much simplified over those of the aforementioned prior art.

With the foregoing and other objects in view, there is provided, in accordance with the invention, in a blow-off device for limiting excess pressure in nuclear power plants, at least one condensation tube disposed so that a lower outlet end therof is immersed in a volume of water in a condensation chamber having a gas cushion located in a space above the volume of water, and the upper inlet end thereof extending out of the volume of water and being connectible to a source of steam that is to be condensed or a steam-air mixture, the outlet end of the condensation tube, for smoothing the condensation, being provided with wall parts forming passages extending in axial direction, delimited from one another and terminating in the water volume, the wall parts serving to subdivide steam flow from the source thereof and bubbles produced thereby in the water volume, the wall parts being constructed as a tube attachment and being formed with an opening corresponding to the outlet end of the condensation tube and by means of which the tube attachment is mounted on the outlet end of the condensation tube, a first group of the wall parts in the tube attachment being disposed in alignment with the outlet end of the condensation tube, and a second group of the wall parts surrounding the first group thereof, the passages formed by the second group of the wall parts communicating laterally with the passages formed by the first group of the wall parts, the passages formed by the second group of the wall parts, at least at the upper ends thereof, communicating with the water volume. The advantages attainable with the invention are that the central steam flow through the passages formed by the wall parts of the tube attachment are not only finely subdivided, but also that the partial steam flows and the subdivided condensation bubbles are wetted and cooled inwardly from the outer periphery.

In accordance with another feature of the invention, the second group of wall parts overlap the outlet end of the condensation tube in axial direction. This has advantages of providing strength and stability and, moreover, a greater cooling and wetting surface or area is afforded thereby.

In accordance with a further feature of the invention, the first and the second groups of wall parts are formed of axially and radially extending plates defining sector-shaped passage cross sections. The central partial steam flows can thereby fan radially outwardly, thereby further increasing the cooling and wetting surface or area.

In accordance with alternate additional features of the invention, whereby the cooling surface or area can be increased even further yet, the first and the second group of wall parts extend axially to the tube attachment, and wave-shaped metal sheets or plates are included which extend transversely to the axially extending wall parts and form zig-zag or serpentine passage cross sections.

For reasons of strength and stability and for the purpose of attaining a definite axial inlet or entry of the cooling water from the water condensate of the condensation chamber into the tube attachment, there is provided, in accordance with an added feature of the invention, a tube attachment having a jacket tube enveloping the wall parts thereof.

For reasons of strength and stability, it is advantageous, moreover, for the tube attachment to have a slide-on tube section which is connected to the wall parts and has an inner diameter corresponding to the outer diameter of the condensation tube per se. Thus, in accordance with a concomitant feature of the invention, a first group of wall parts is surrounded by a slide-on tube having an inner diameter corresponding to the outer diameter of the condensation tube at the outlet end thereof and being slidable onto the outlet end of the condensation tube, the second group of wall parts being secured to the slide-on tube at the outer peripheral surface thereof, the slide-on tube being formed with openings in the surface thereof through which the passages formed by the first and second groups of wall parts are in communication with one another. The tube attachment is thereby formed of two coaxial tubes, a slide-on tube, and a jacket tube, the inner space of the slide-on tube, disregarding the insertion opening for the condensation tube, being filled-in with the wall parts, and the peripheral space between the slide-on tube and the wall surface of the jacket tube being also filled in with wall parts. Although the invention is illustrated and described as embodied in blow-off device for limiting excess pressure in nuclear power plants, especially in boiling water- nuclear plants, it is nevertheless not intended to be limited to the details shown, since various modifications and structural changes may be made therein without departing from the spirit of the invention and within the scope and range of equivalents of the claims.

The construction and method of the invention, however, together with additional objects and advantages thereof will be best understood from the following description of specific embodiments when read in connection with the accompanying drawings, in which.

Figure 1:
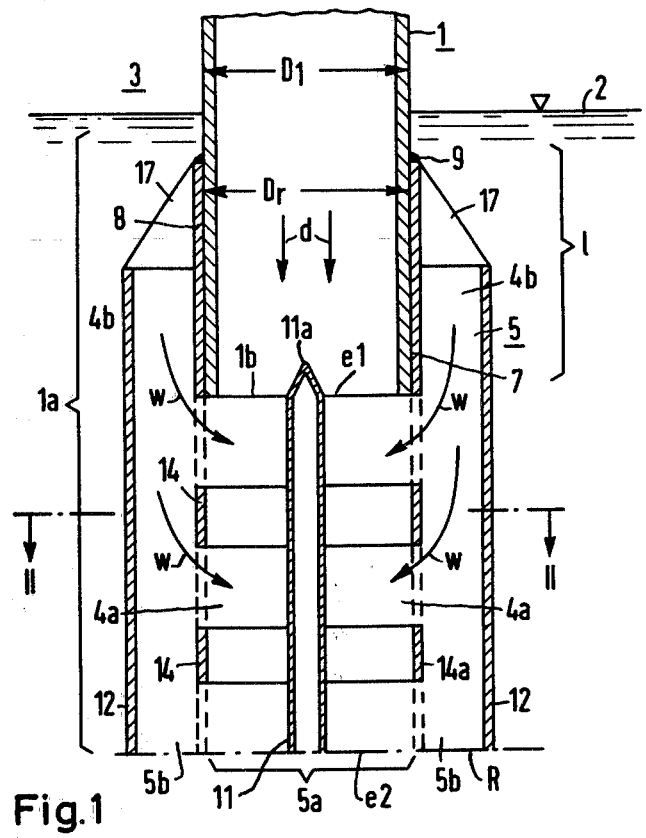
FIG. 1 is a longitudinal sectional view of part of a blow-off device according to the invention showing one condensation tube thereof with a tube attachment, wall parts of which that are in alignment with the condensation tube, namely the radially inner wall parts, having been omitted in the interest of clarity.
Figure 2D:
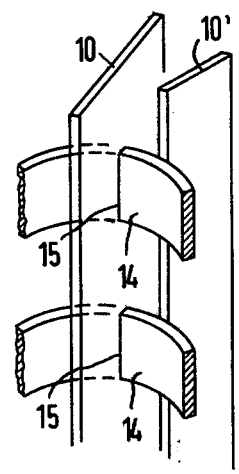
FIG. 2a is a cross-sectional view of FIG. 1 taken along the line II—II and showing the two left-hand quadrants II and III thereof.
FIG. 2b is a cross-sectional view of FIG. 1 taken along the line II—II showing the upper right-hand quadrant I of another embodiment of the invention.
FIG. 2c is a cross-sectional view of FIG. 1 also taken along the line II—II showing the lower right-hand quadrant IV of a third embodiment of the invention.
Figure 3:
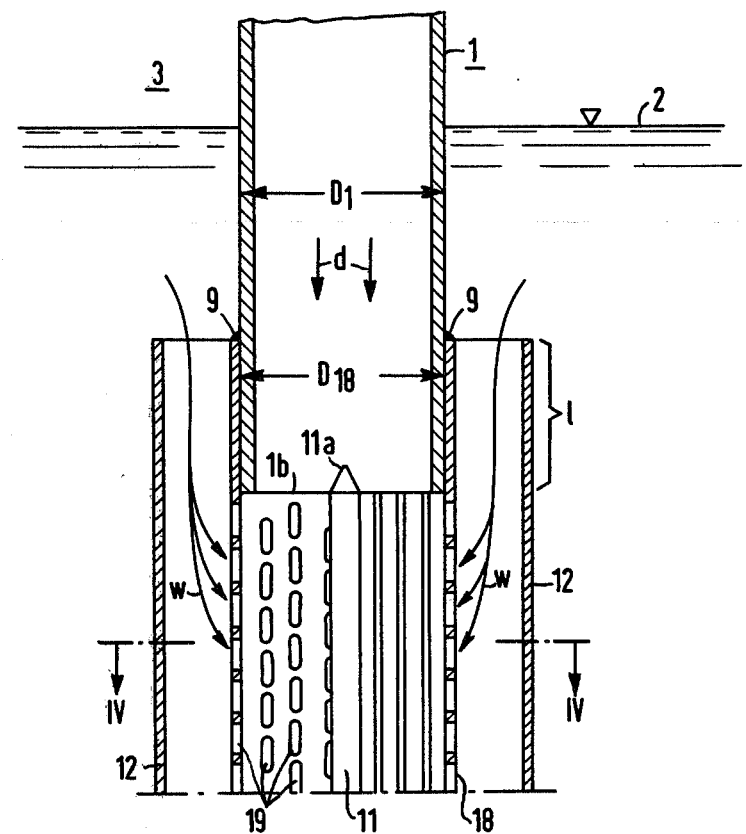
Figures 4A, 4B:
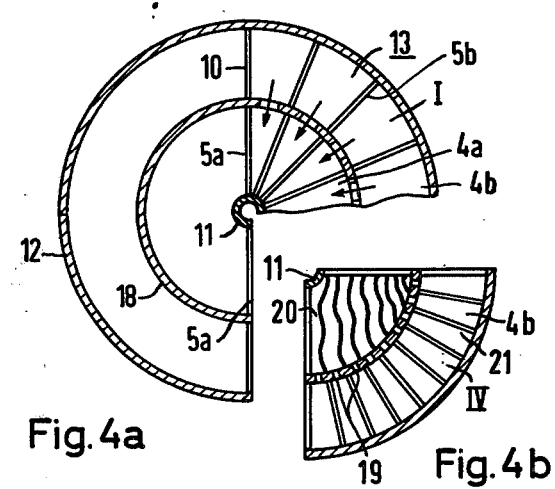

FIG. 2d is a fragmentary perspective view of FIG. 1 showing radially oriented wall portions which are held centered and defined by divided rings; FIG. 3 is a view similar to that of FIG. 1 of a fourth embodiment of the invention, in the interest of clarity, the radially inner and outer wall parts having been omitted from the left-hand side of the drawing, and only the radially inner wall parts and the inner tube having been omitted from the right-hand side thereof;

FIG. 4a is a cross-sectional view of FIG. 3 taken along the line IV—IV showing the upper right-hand quadrant I of FIG. 3 having radially oriented wall parts and both quadrants at the left-hand side of FIG. 3; and FIG. 4b is a cross-sectional view of FIG. 3 also taken along the line IV—IV showing the lower right-hand quadrant IV of a fifth embodiment of the invention having wave-shaped wall parts for the radially inner group of wall parts and radially oriented wall parts for the radially outer group thereof.

Referring now to the drawing and first, particularly, to FIG. 1 thereof, there is shown one condensation tube 1 forming part of a blow-off device for limiting excess pressure in nuclear power plants. Especially in a boiling-water nuclear power plant, a multiplicity of such condensation tubes 1 are disposed with the lower discharge ends 1a thereof immersed in a volume of water 2 received in a condensation chamber having a gas cushion 3 (such as an air space, especially) thereabove. Only one of such a condensation tube 1 is shown as an example of the multiplicity thereof in the blow-off device, the condensation tube 1 being connected at the upper inlet end thereof, as viewed in FIG. 1, which projects upwardly out of the water condensate 2, to a source of steam to be condensed or to a steam-air mixture. The illustrated condensation tube 1 is provided especially for blow-off devices of so-called pressure reduction systems for boiling-water reactors, the pressure reduction system being located within a safety vessel. It is the main objective of such a pressure reduction system, in the event of a coolant loss due to condensation of discharging steam-water mixture, to reduce the pressure rapidly. In this regard, as hereinaforementioned, a number of condensation tubes 1 are provided in the pressure reduction system which lead from a pressure chamber into the water condensate 2 of the condensation chamber. The water condensate 2 is thereby subcooled in accordance with the saturation pressure thereof.

The equipment of the pressure reduction system are also advantageously employed for other purposes. Thus, the steam of the pressure-relieving and safety valves is conducted also through corresponding condensation tubes into the water condensate. Also, the exhaust steam of the emergency condensation and the emergency feed turbines are conducted expediently into the condensation chamber, since it is assumed that when these turbines are used, the main condenser is no longer available.

It is important for the condensation process, that a very broad spectrum of possible steam flow densities exists. Thus, high steam flow densities are present in the case of the blow-off of the relief valves into the respective condensation tubes, and the same at the beginning of a coolant loss-disturbance. In contrast thereto, in the exhaust steam lines and the respective condensation tubes of the emergency condensation and the emergency feed turbines as well as in the course of a coolant loss-disturbance, the steam flow densities are low. The incident steam flow densities thus extend from about 1000 kg/m$^2$×sec during blow-off of the relief valve down to 2 to 10 kg/m$^2$×sec for steam vagabond flows.

So that the steam flow and the bubbles produced in the volume of water become subdivided and a smooth condensation process is produced during blow-off, the discharge or outflowing end 1a of the condensation tube 1 is provided with wall parts 5 forming passages extending in axial direction, delimited from one another and terminating in the ater condensate 2. The wall portions 5 are constructed as a tube attachment R, which is mounted on the tube end 1b and has an opening 7 corresponding to the tube end 1b. The tube attachment R has a first group 5a of the wall parts 5 (FIGS. 2a and 2b) which are disposed in alignment with the tube end 1b, and furthermore a second group 5b of the wall parts 5 which surround the first group 5a of the wall parts and communicates laterally with the passages 4a thereof. The second group 5b of the wall parts 5 is, like the first group 5a of the wall parts 5, open at the lower end thereof, as viewed in FIG. 1. While the first group 5a of the wall parts forms, with the passages thereof opening upwardly to the inlet or inflowing end e1 thereof, a direct continuation of the flow channel formed through the condensation tube 1, the upper similarly open ends of the passages 4b formed by the second group 5b of the wall parts communicate with the water condensate 2. The wall parts-group 5a do not necessarily have to be open at the lower end thereof, as viewed in FIG. 1, if adequate flow-through cross-section from the first group 5a to the second group 5b is provided and adequate outlet cross section through the wall parts 5b is formed.

As is apparent from FIG. 1, the second group 5b of the wall parts 5 overlaps the tube end 1b in axial direction. The tube attachment R, in vicinity of the opening 7 thereof, is provided with a tube section 8 having an inner diameter $D_r$ which corresponds to the outer diameter $D_1$ of the condensation tube 1 so that, along the axial overlapping length 1, the tube attachment R is slid onto the condensation tube 1. A circular welding seam 9 is provided between the tube attachment R and the condensation tube 1 so as to affix them one to the other.

Figures 2A, 2B, 2C:
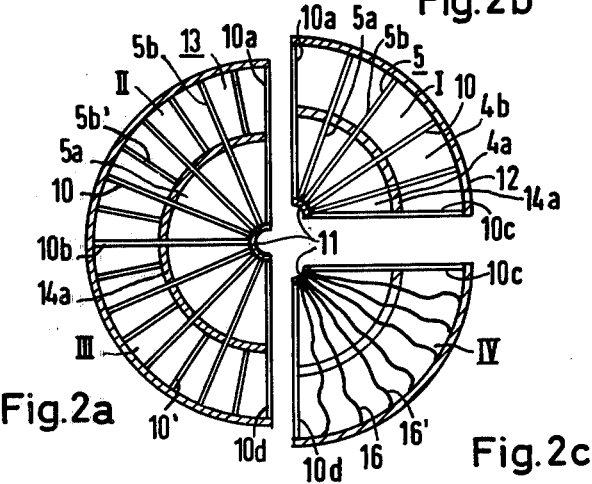

The two embodiments shown in FIGS. 2a and 2b have first and second groups 5a and 5b, respectively, of the wall parts 5 with metal sheets or plates 10 extending in radial and axial directions of the tube attachment R, the metal sheets or plates 10 forming sector-shaped flow-through cross sections 4a and 4b. Whereas, in the embodiment of quadrant I as shown in FIG. 2b, the metal sheets or plates 10 extend from a central tube 11 to an outer jacket tube 12 and form sector-shaped through-passages 4 i.e. the wall parts 5a and 5b are united one with the other, in the embodiment of quadrants II and III as shown in FIG. 2a, in addition to the radially extending metal sheets or plates 10 in the annular space 13 of the second group 5b of the wall parts, a further subdivision by means of additional radially extending wall parts 10' is encountered. The passageway channels in the annular space 13 are therefore again subdivided. To hold these additional wall parts 10', divided rings 14 (note also FIG. 2d) are inserted into slots 15 formed in the metal sheets or plates 10. The ring halves of the rings 14 are provided, respectively, at the ends thereof with overlapping locations and are then welded into a continuous ring 14 (note the welding locations 14a in FIGS. 2a and 2b). Moreover, the metal sheets or plates 10 are connected, respectively, at the radially inner edge thereof to the central tube 11 and at the radially outer edge thereof to the jacket tube 12, preferably by welding. The additional wall parts 10' formed as intermediate metal sheets or plates are correspondingly welded at the radially inner edges thereof to the rings 14 and, similarly, at the radially outer edges thereof to the inner peripheral surface of the jacket tube 12. The embodiment of quadrant IV shown in FIG. 2c corresponds to that of FIG. 2a except that instead of the flat metal sheets or plates 10 and 10', serpentive metal sheets or plates 16 and 16' extending sinuously in radial direction are used, by means of which the wetting and cooling surfaces are able to be increased. Instead of having a serpentine waviness, the metal sheets or plates 16 and 16' may also be zig-zag-shaped.

To brace or stiffen the tube attachment R, the main metal sheets or plates 10a to 10d disposed on a rectangular coordinate cross are increased in length in axial direction in accordance with the areas 17 and are welded to the tube or sleeve 8 that is slid onto the tube end 1b. The central tube 11, as illustrated, can be provided with a flow cone 11a, so that a flow-facilitating transition of the central steam jet or current to the passage cross section 5a occurs. This is especially indicated for full cross section of the central tube 11 which then forms a rod. The central tube 11 can, however, also have a hollow construction with a sharp rim so that a given fraction of the steam flow flows through the interior thereof. The course of the steam flow is indicated by arrows d and the course of the water fraction flowing in from the water condensate 2 is indicated by arrows w. Furthermore, a transition cone can be provided at the lower end of the central tube, as viewed in FIG. 1, which would then cover nearly the entire area 5a, so that a transition to the surface area of the wall parts 5b would occur and a lengthening of the wetting and cooling lengths may be imparted thereto.

The two additional embodiments of the invention shown in FIGS. 3, 4a and 4b have in common that the first group 5a of the wall parts 5 is surrounded by a tube 18 that is slidable onto the tube end 1b, the tube 18 having an inner diameter $D_{18}$, as mentioned hereinbefore with respect to the tube attachment-sleeve 8 according to FIG. 1, corresponding to the outer diameter $D_1$ of the condensation tube 1, so that this tube 18 is also slidable onto the condensation tube 1 i.e. the tube end 1b thereof. This slide-on tube 18 extends, however, through to the lower end of the tube attachment R, as viewed in FIG. 3, so that the second group 5b of the wall parts (annular space 13) surrounds the inner tube 18 along the entire axial length thereof, and also the entire axial length is available for fastening purposes. In order that the passages 4b will communicate with the passages 4a, the inner tube 18 is formed with openings 19 over the entire surface thereof, the openings 19 being in the form of slots disposed in rows 19a in the illustrated embodiment of FIG. 3. For reasons of strength, the slot rows 19 adjacent one another in peripheral direction are offset by half a slot-length from one another. In addition, like parts in the various embodiments shown in FIGS. 1, 2a, 2b, 2c and 3 are identified by the same reference characters.

The embodiment of the invention in quadrant IV shown in FIG. 4b is modified with respect to the embodiment shown in FIG. 4a in that the first group 5a of the wall parts 5 is formed of wave-shaped metal sheets or plates 20 which, in contrast to the serpentive metal sheets or plates 16 of FIG. 2c, are not radially oriented but rather have a chord-like orientation. Through the slot openings 19 of the inner tube 18, the passages 4a between the metal sheets or plates 20 are also, in the embodiment of FIG. 4b, connected flow-wise with the passages 4b between the radially oriented metal sheets or plates 21 of the second group 5b of wall parts. A subdivision of the steam blows and of the bubbles that are formed occurs also with this embodiment of the invention, as well as also a fanning out of the steam flow or the steam-air-water mixture discharging from the tube end 1b to the larger passage cross section, which is formed by the tube attachment inner sleeve 18. The operation of the embodiments of FIGS. 3, 4a and 4b, as illustrated by the arrows d and w in FIG. 3, corresponds to the operation of the first three embodiments of the invention shown in FIGS. 1, 2a, 2b, 2c and 2d.

There is claimed:

1. In a blow-off device for limiting excess pressure in nuclear power plants, at least one condensation tube disposed so that a lower outlet end thereof is immersed in a volume of water in a condensation chamber having a gas cushion located in a space above the volume of water, and the upper inlet end of the condensation tube extending out of the volume of water and being connectible to a source of steam that is to be condensed or a steam-air mixture, the outlet end of the condensation tube, for smoothing the condensation, being provided with wall parts forming passages extending in axial direction, delimited from one another and terminating in the water volume, said wall parts serving to subdivide steam flow from the source thereof and bubbles produced thereby in the water volume, said wall parts being constructed as a tube attachment and being formed with an opening corresponding to said outlet end of said condensation tube and by means of which said tube attachment is mounted on said outlet end of said condensation tube, a first group of said wall parts in said tube attachment being disposed in alignment with said outlet end of said condensation tube, and a second group of said wall parts surrounding said first group thereof, the passages formed by said second group of said wall parts communicating laterally with the passages formed by said first group of said wall parts, the passages formed by said second group of said wall parts, at least at the upper ends thereof, communicating with the water volume, said first and said second groups of wall parts being formed of axially and radially extending plates defining sector-shaped passage cross sections.

2. Device according to claim 1 wherein said second group of wall parts overlap said outlet end of said condensation tube in axial direction.

3. Device according to claim 1 wherein said tube attachment has a jacket tube enveloping said wall parts thereof.

4. In a blow-off device for limiting excess pressure in nuclear power plants, at least one condensation tube disposed so that a lower outlet end thereof is immersed in a volume of water in a condensation chamber having a gas cushion located in a space above the volume of water, and the upper inlet end of the condensation tube extending out of the volume of water and being connectible to a source of steam that is to be condensed or a steam-air mixture, the outlet end of the condensation tube, for smoothing the condensation, being provided with wall parts forming passages extending in axial direction, delimited from one another and terminating in the water volume, said wall parts serving to subdivide steam flow from the source thereof and bubbles produced thereby in the water volume, said wall parts being constructed as a tube attachment and being formed with an opening corresponding to said outlet end of said condensation tube and by means of which said tube attachment is mounted on said outlet end of said condensation tube, a first group of said wall parts in said tube attachment being disposed in alignment with said outlet end of said condensation tube, and a second group of said wall parts surrounding said first group thereof, the passages formed by said second group of said wall parts communicating laterally with the passages formed by said first group of said wall parts, the passages formed by said second group of said wall parts, at least at the upper ends thereof, communicating with the water volume, said first and said second group of wall parts extend axially to said tube attachment, and including wave-shaped plates extending transversely to said axially extending wall parts and forming serpentine passage cross sections.

5. In a blow-off device for limiting excess pressure in nuclear power plants, at leat one condensation tube disposed so that a lower outlet end thereof is immersed in a volume of water in a condensation chamber having a gas cushion located in a space above the volume of water, and the upper inlet end of the condensation tube extending out of the volume of water and being connectible to a source of steam that is to be condensed or a steam-air mixture, the outlet end of the condensation tube, for smoothing the condensation, being provided with wall parts forming passages extending in axial direction, delimited from one another and terminating in the water volume, said wall parts serving to subdivide steam flow from the source thereof and bubbles produced thereby in the water volume, said wall parts being constructed as a tube attachment and being formed with an opening corresponding to said outlet end of said condensation tube and by means of which said tube attachment is mounted on said outlet end of said condensation tube, a first group of said wall parts in said tube attachment being disposed in alignment with said outlet end of said condensation tube, and a second group of said wall parts surrounding said first group thereof, the passages formed by said second group of said wall parts communicating laterally with the passages formed by said first group of said wall parts, the passages formed by said second group of said wall parts, at least at the upper ends thereof, communicating with the water volume, said first and said second group of wall parts extending axially to said tube attachment, and including plates extending transversely to said axially extending wall parts and forming zig-zag passage cross sections.

6. In a blow-off device for limiting excess pressure in nuclear power plants, at least one condensation tube disposed so that a lower outlet end thereof is immersed in a volume of water in a condensation chamber having a gas cushion located in a space above the volume of water, and the upper inlet end of the condensation tube extending out of the volume of water and being connectible to a source of steam that is to be condensed or a steam-air mixture, the outlet end of the condensation tube, for smoothing the condensation, being provided with wall parts forming passages extending in axial direction, delimited from one another and terminating in the water volume, said wall parts serving to subdivide steam flow from the source thereof and bubbles produced thereby in the water volume, said wall parts being constructed as a tube attachment and being formed with an opening corresponding to said outlet end of said condensation tube and by means of which said tube attachment is mounted on said outlet end of said condensation tube, a first group of said wall parts in said tube attachment being disposed in alignment with said outlet end of said condensation tube, and a second group of said wall parts surrounding said first group thereof, the passages formed by said second group of said wall parts communicating laterally with the passages formed by said first group of said wall parts, the passages formed by said second group of said wall parts, at least at the upper ends thereof, communicating with the water volume, said first group of wall parts being surrounded by a slide-on tube having an inner diameter corresponding to the outer diameter of said condensation tube at said outlet end thereof and being slidable onto said outlet end of said condensation tube, said second group of wall parts being secured to said slide-on tube at the outer peripheral surface thereof, said slide-on tube being formed with openings in said surface thereof through which said passages formed by said first and second groups of wall parts are in communication with one another.

* * * * *